United States Patent

Knight

[15] 3,648,110

[45] Mar. 7, 1972

[54] CIRCUIT PROTECTION APPARATUS UTILIZING OPTICAL TRANSMISSION PATH

[72] Inventor: Stephen Knight, Murray Hill, N.J.

[73] Assignee: Bell Telephone Laboratories, Incorporated, Murray Hill, N.J.

[22] Filed: Aug. 20, 1970

[21] Appl. No.: 65,579

[52] U.S. Cl. ....................................317/16, 317/31, 317/50, 307/93, 317/125, 317/36 TD

[51] Int. Cl. ..........................................................H02h 3/22

[58] Field of Search....................317/16, 31, 125, 36 TD, 50; 307/117, 93, 130, 100

[56] References Cited

UNITED STATES PATENTS 3,434,010 3/1969 Weit ....................................317/31 X 3,214,640 10/1965 Mills ........................................317/31

3,428,865 2/1969 Opad ........................................317/31

*Primary Examiner*—D. F. Duggan

*Assistant Examiner*—Harvey Fendelman

*Attorney*—R. J. Guenther and Arthur J. Torsiglieri

[57] ABSTRACT

High-speed circuit protection from high-current pulses is obtained by providing a transmission line loop that includes a light emitter and photodetector at opposite ends of the loop. The optical link between the emitter and photodetector is much shorter than the electrical path of the loop. A spurious high-current pulse excites the emitter, causing the photodetector to arm a dissipating or shunting element before the pulse traverses the loop. Thus, circuit protection from very high-rise time pulses can be provided by relatively low-response time elements. Other embodiments are also described.

5 Claims, 4 Drawing Figures

Patented March 7, 1972 3,648,110

INVENTOR
BY S. KNIGHT

Roderick B. Anderson
ATTORNEY

CIRCUIT PROTECTION APPARATUS UTILIZING OPTICAL TRANSMISSION PATH

BACKGROUND OF THE INVENTION

This invention relates to circuit protection apparatus, and more particularly, to apparatus for protecting circuits from spurious high-voltage, high rise time, pulses.

The literature is replete with disclosures of devices for protecting circuits from spurious high-current pulses such as those caused by lightning. Studies and experiments have shown, however, that these devices are insufficient to protect many circuits from the high-voltage, high rise time, pulses typically generated by a nuclear explosion. It is, of course, important that telephone circuits be protected from such pulses so that essential communications systems would at all times be available.

Conventional protective devices do not have a sufficiently fast, or high-speed, responsive time to prevent extremely high rise time pulses from reaching the circuit to be protected. Known switching devices and the like that have a sufficiently high speed do not typically have the power-handling capabilities required for shunting or otherwise neutralizing such high-voltage pulses.

SUMMARY OF THE INVENTION

It is an object of this invention to provide apparatus capable of protecting electronic circuits from high rise time, high-voltage, pulses.

This and other objects of the invention are attained in an illustrative embodiment of the type described in the Abstract of the Disclosure. By making use of a short optical path between the light emitter and photodetector in parallel with a relatively long electrical loop that the spurious pulse to be dissipated must follow, reliable circuit protection is provided by relatively inexpensive components.

In another embodiment, a short electrical transmission link is used in place of the optical path, and a gas diode switch is used instead of the photodetector. A small portion of the current on the transmission line is directed by the short electrical link, in parallel with the transmission line loop, to the gas discharge switch. If the voltage on the transmission line is sufficiently high, as would be true with a spurious high-voltage pulse, the energy shunted by the short electrical link will be sufficient to trigger the gas discharge device prior to the arrival over the transmission line loop of the major portion of the high-current pulse, thereby permitting the pulse to be dissipated.

In another embodiment, a Zener diode breaks down in response to a high-voltage pulse and transmits a signal to a PIN diode over a short electrical link in parallel with the transmission line loop. The signal forward biases the diode prior to the arrival of the pulse via the transmission line loop, thus permitting the diode to dissipate the leading edge of the pulse.

These and other objects, features, and advantages of the invention will be better understood from a consideration of the following detailed description taken in conjunction with the accompanying drawing.

DRAWING DESCRIPTION

DETAILED DESCRIPTION

Figure 1:
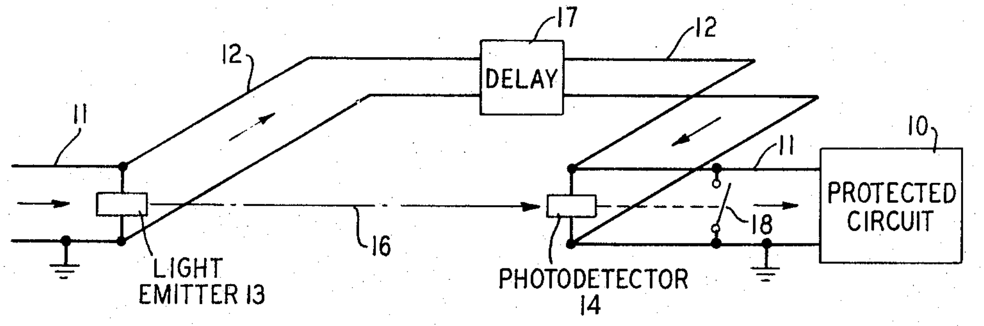
FIG. 1 is a schematic diagram of circuit protection apparatus in accordance with one embodiment of the invention.

Referring now to FIG. 1, there is shown apparatus for short circuiting a transmission line 11 in response to a spurious high voltage pulse on the transmission line, thereby to prevent the current pulse from reaching electronic circuitry 10 connected to the transmission line that could be damaged by it. The protective apparatus comprises a transmission line loop 12 extending between a light emitter 13 and a photodetector 14. An optical link or path 16 is defined between the light emitter and the photodetector so that light emitted by emitter 13 is received and detected by photodetector 14. The transmission line loop 12 includes an electrical delay device 17 which insures that the electrical length of the transmission line loop 12 is much longer than the optical length of optical path 16; that is, it takes electrical energy much longer to travel from emitter 13 to photodetector 14 via loop 12 than for light energy to travel from the emitter to the photodetector via optical path 16.

The light emitter 13 is made in any of a number of known ways to emit light only in response to a voltage above a threshold value. More specifically, it is designed to be unresponsive to currents transmitted by the transmission line 11 during normal operation of the circuitry. If, however, a sufficiently high voltage pulse traveling in the direction shown by the arrow reaches light emitter 13, it will emit light which in turn will be detected by the photodetector 14. The photodetector is designed to actuate a switch 18 which short circuits transmission line 11. Thus, during normal operation the photodetector performs no function; but, when actuated by the light emitter, it short circuits the transmission line to prevent any pulse traveling in the direction shown by the arrows to reach the circuit 10 being protected.

From the foregoing, it can be appreciated that, if the time taken for switch 18 to be closed in response to a high current pulse at light emitter 13 is shorter than the time taken for the pulse to travel around transmission line loop 12, then switch 18 will be closed before any deleterious high-current pulse reaches that location. Therefore, the delay provided by delay device 17 and the electrical length of loop 12 is designed to be longer than the combined response times of elements 13, 14, and 18. It can be appreciated that, with this technique, conventional components are capable of providing complete protection from pulses having even the steepest leading edges; whereas, if switch 18 were designed to be actuated directly by the pulse, a significant portion of the pulse would be transmitted downstream on transmission line 11 before the switch were closed, unless the switch had an extremely high response time. Even then, part of the pulse may be transmitted if it has a high rise time as is sometimes characteristic of pulses generated by a nuclear explosion.

Protective apparatus of this type is particularly useful in microwave circuits used as telephone trunk lines because of the importance of keeping such circuits in an operative condition in event of a catastrophe. The transmission lines 11 and 12 may be strip transmission lines of a type widely used for transmitting microwave energy. The delay device 17 may be an acoustic delay device of a type known in the art, or alternatively, the transmission line loop 12 may be sufficiently long to provide the necessary delay without including a separate delay component. Light emitter 13 is preferably any of a number of junction-type light emitting diodes which, as is known will emit light in response to an appropriate voltage and current. The photodetector 14 may be a device which actuates a separate switch as shown, or it may simply be a layer of cadmium sulphide included between the active and ground conductors of the strip transmission line which becomes conductive upon being exposed to light and thereby short circuits the transmission line as described above.

Figure 2:
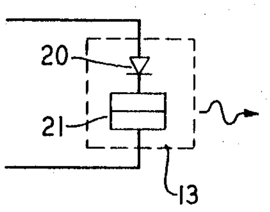
FIG. 2 is a schematic diagram of the light emitter of FIG. 1.

As illustrated in FIG. 2, the light emitter 13 may comprise an avalanche diode 20 in series with a light-emitting diode 21 for the purpose of defining a predetermined threshold at which light is emitted by the diode. A fully depleted Schottky barrier diode may advantageously be used as diode 20; this diode can be constructed in a known manner to be conducting only in response to voltages in excess of a specific threshold, such as for example 100 volts. The light-emitting diode 21 may be a junction-type injection laser which emits a well-defined collimated light beam in response to current above a threshold value. Gallium arsenide injection lasers capable of operating at room temperature appear to be particularly suitable, although any of numerous other light emitters may be used. Various optical elements may, of course, be included along the optical path 16 if so desired.

Figure 3:
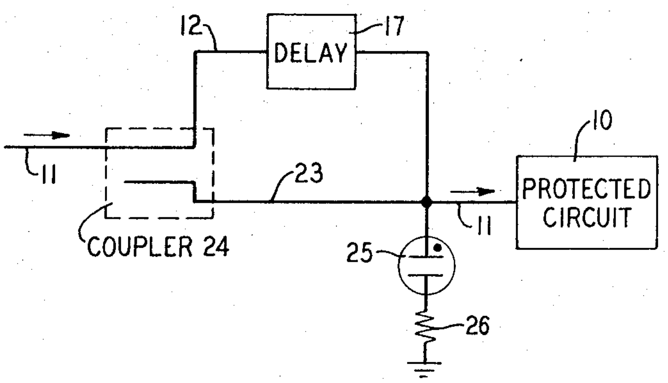
FIG. 3 is a schematic diagram of circuit protection apparatus in accordance with another embodiment of the invention.

FIG. 3 illustrates the use of a subsidiary electrical transmission link 23 in place of the optical path 16 of FIG. 1. As before, a pulse on transmission line 11 travels through transmission line loop 12 and delay line 17. The loop extends between a coupler 24 and a gas discharge diode switch 25. The coupler 24 is designed to shunt a small portion of electrical energy from line 11 to subsidiary link 23, and thence to the diode switch 25. The diode switch is responsive to voltages above a threshold, and if the threshold voltage is exceeded, transmission line 11 is short circuited and energy on it is directed to a dissipative impedance 26.

The coupler 24 may be a 20 db. coupler which removes about one one-hundredth of the electrical energy on line 11 to link 23. The gas discharge diode 25 may be of a well-known type designed to conduct when subjected to voltages in excess of 1 volt.

Assume that under proper operation, the circuit produces voltages of no more than 1 volt. Then, the diode 25 will remain nonconducting and current will be transmitted as shown by the arrows. If a spurious voltage of between 1 volt and 100 volts is transmitted on the line, the portion directed by the coupler 24 to the short electrical link 23 will be insufficient to cause breakdown and the conduction by the diode 25. However, when the pulse itself reaches the diode, it will cause a breakdown and the major portion of the pulse will be absorbed by dissipative impedance 26 in the usual manner. Because of the relatively slow response time of diode 25, however, the leading edge of the pulse will be transmitted toward the protected circuit, particularly if the rise time of the pulse is fairly high.

If the spurious voltage pulse exceeds 100 volts, then the portion of the pulse transmitted by path 23 will be sufficient to cause breakdown and conduction of the diode 25. Thus, by the time the pulse itself reaches diode 25, the diode will be conducting, and the entire pulse will be transmitted to and absorbed by dissipative impedance 26. Thus, the embodiment of FIG. 3 operates on the principle that, for spurious voltages below a certain value, a conventional protective device such as diode 25 is sufficient. However, if the pulse exceeds that high prescribed value, complete protection requires that the protective device be armed before the pulse arrives so that the entire pulse can be dissipated.

The embodiment of FIG. 3 shows the use of a dissipative impedance 26 which preferably is matched to transmission line 11 to give absorption without reflection. Such a dissipative impedance could likewise be used in the embodiment of FIG. 1 to minimize reflection. The 20 db. coupler 24 of FIG. 3 is merely one device of many that could be used for tapping off a specified part of the energy on transmission line 11. If so desired, a threshold diode such as diode 20 could be used along with a resistor for tapping off a portion of the energy if the pulse exceeded a critical value.

Figure 4:
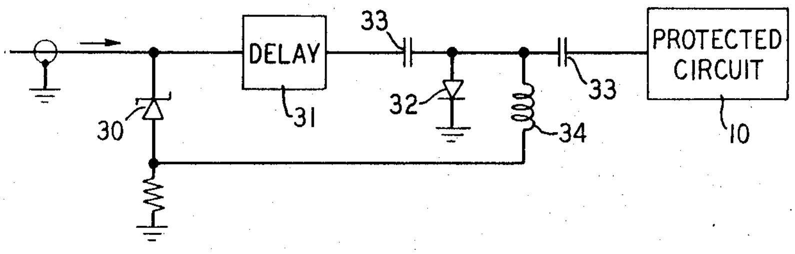
FIG. 4 is a schematic diagram of circuit protection apparatus in accordance with yet another embodiment of the invention.

Referring to FIG. 4, another embodiment comprises an avalanche diode 30, a delay device 31, and a PIN diode switch 32. If an input pulse exceeds a threshold value, the diode 30 breaks down and forward biases diode 32. During the time that diode 32 is forward biased, current from delay device 32 is short circuited to ground.

The diode 32 of the FIG. 4 circuit operates to dissipate the leading edge only of a deleterious high-voltage pulse. Assume, for example, that diodes 30 and 32 each have a 100-nanosecond response time, giving a total delay of 200 nanoseconds after a pulse reaches avalanche diode 30 before diode 32 is switched. Assume next that the delay device 31 gives a 250-nanosecond delay. Then, switch 32 short circuits the transmission 50 nanoseconds before the arrival of a high voltage pulse. Capacitors 33 are DC blocking capacitors and inductor 34 is an RF choke which together isolate the biasing function. Diode 30 may be a Zener diode.

Various other embodiments and modifications may be made by those skilled in the art without departing from the spirit and scope of the invention.

What is claimed is:

1. Circuit protection apparatus comprising:

a transmission line including first and second locations between which it is capable of transmitting electrical current within a prescribed time;

a subsidiary transmission link interconnecting said first and second locations;

means electrically coupled to the transmission line at the first location for generating a signal in response to a high-voltage pulse on the transmission line and directing said signal along the subsidiary transmission link;

switching means located at said second location for shunting or dissipating high current pulses on said transmission line, said switching means being actuable by said signal;

the time required for the signal to travel from said first to said second locations being substantially smaller than said prescribed time period, whereby the switching means is actuated by the signal before a high voltage pulse reaches the second location.

2. The circuit protection apparatus of claim 1 wherein:

the signal-generating means is a light emitter, the transmission link is an optical transmission path, and said switching means is responsive to light energy.

3. The circuit protection apparatus of claim 1 wherein:

said subsidiary transmission link comprises means for conducting a small portion of said high-current pulse;

and said switching means is an electrical switch responsive to voltages above a threshold value.

4. The circuit protection apparatus of claim 1 wherein:

the transmission line includes electrical delay means between said first and second locations.

5. Circuit protection apparatus comprising:

a transmission line including first and second locations between which it is capable of transmitting electrical current within a prescribed time period;

means comprising a light-emitting source electrically coupled to the transmission line at said first location for emitting light in response to a spurious current surge in the transmission line;

a photodetector, responsive to light from said source, located at said second location; and switching means actuable by said photodetector for shunting or dissipating high current pulses on said transmission line;

the time required for light to travel from said source to said photodetector being substantially smaller than said prescribed time period, whereby said switching means is actuated by a spurious current pulse before the pulse reaches the second location.

* * * * *